Nov. 1, 1938.  E. H. KOCHER  2,134,719
COUPLING CONNECTION
Filed May 26, 1934  2 Sheets-Sheet 1
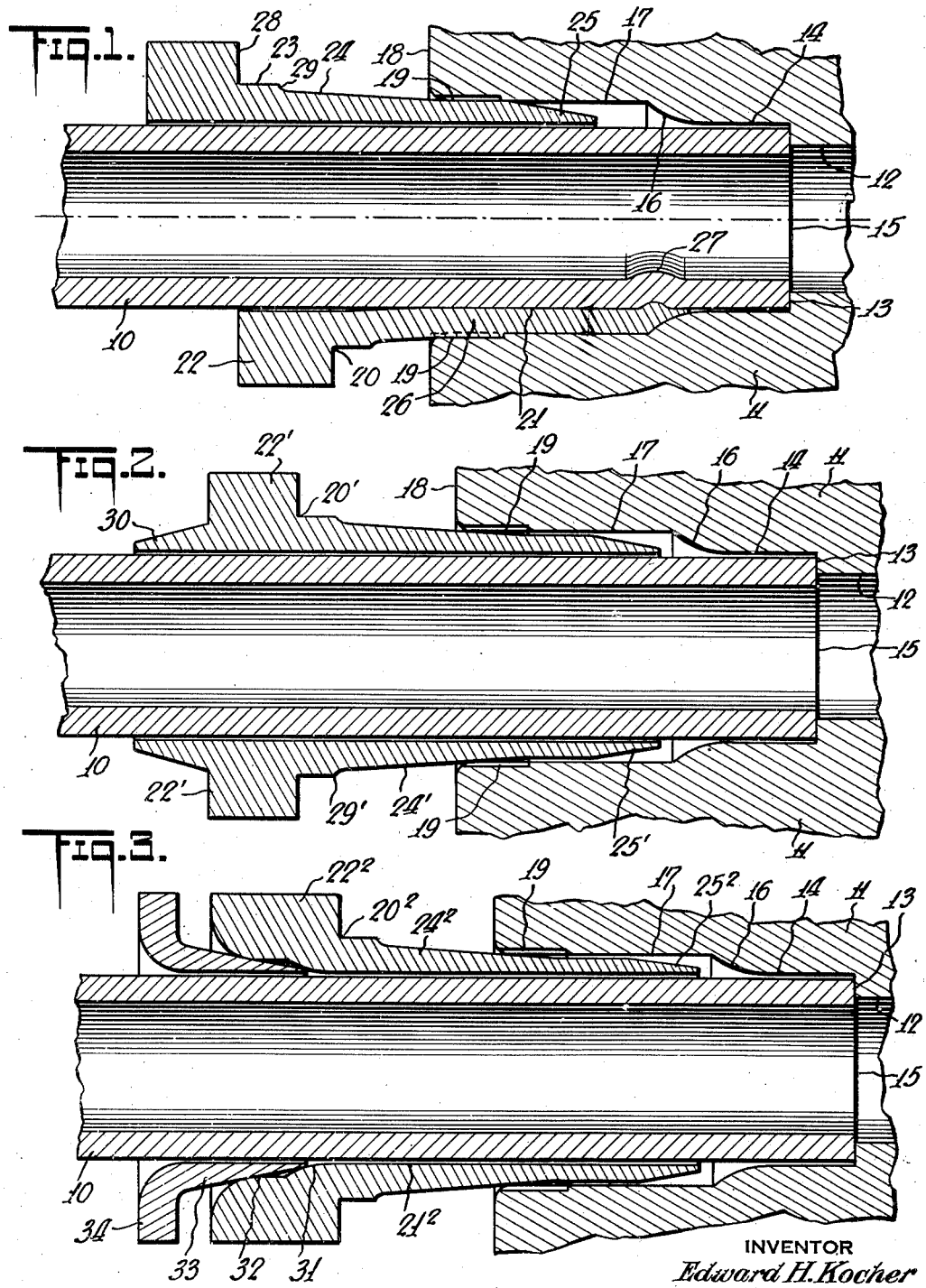
INVENTOR
Edward H. Kocher
BY
Dean Fairbank Hirsch & Foster
ATTORNEYS Nov. 1, 1938.  E. H. KOCHER  2,134,719
COUPLING CONNECTION
Filed May 26, 1934  2 Sheets-Sheet 2
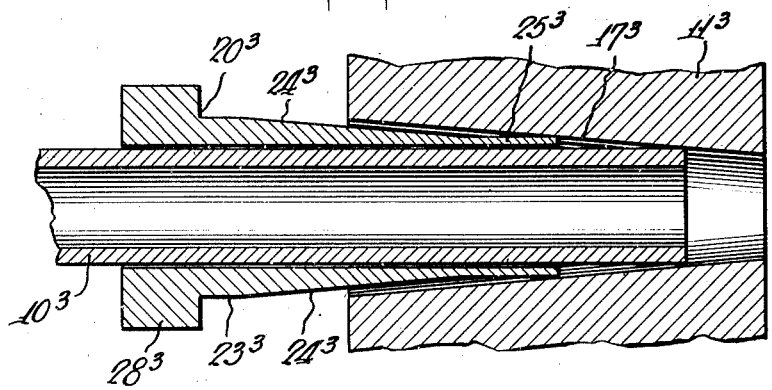
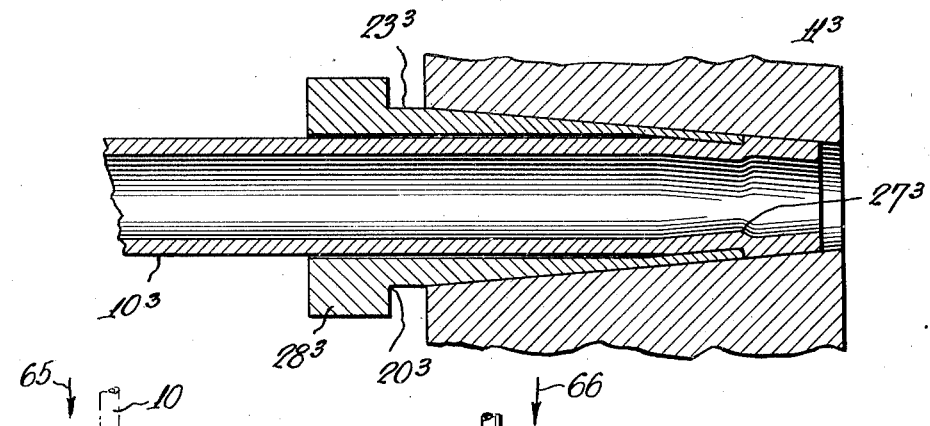
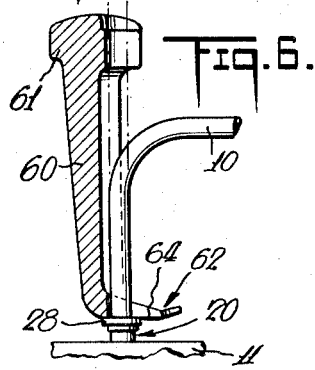
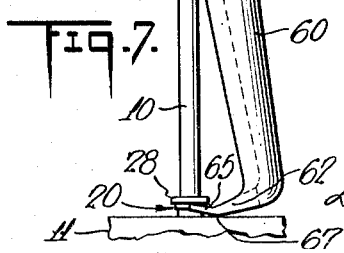
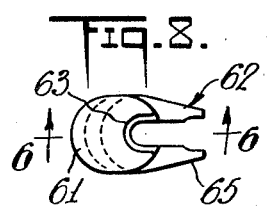
INVENTOR
Edward H. Kocher
BY
Dean Fairbank Hirsch & Foster
ATTORNEYS Patented Nov. 1, 1938

2,134,719

UNITED STATES PATENT OFFICE 2,134,719

COUPLING CONNECTION

Edward H. Kocher, Boonton, N. J., assignor to Auto Research Corporation, a corporation of Delaware Application May 26, 1934, Serial No. 727,720

7 Claims. (Cl. 285—182)

The present invention relates to compression coupling connections, and it particularly relates to compression couplings for aluminum, copper and brass tubing of relatively small diameter and bore, as for example, utilized in central machine and automobile chassis lubrication installations.

Considerable difficulty has been encountered with compression couplings in which a tubing end is crimped by a tapered sleeve, which has been deformed by a threaded bushing or nut and which has been screwed onto a threaded nipple or into a threaded socket of a mounting element, such as a bearing or a junction fitting. These threaded nuts or bushings and tapered sleeves are of small size and require careful handling which is objectionable in mass production, particularly upon automobile assembly lines. Also these relatively small compression sleeves frequently tend to cock or would become misaligned resulting in the formation of defective couplings which were not lubricant tight.

Furthermore, the coupling operation necessitates the use of wrenches on the nuts or bushings to tighten them into position. This tightening operation not only involves considerable manual labor, but in addition there is often danger that the tubing may be gripped with greater force by the turning nut or bushing element of the coupling than by the mounting structure, with the result that the tubing would be substantially twisted and deformed during the coupling.

Among the objects of the present invention are to provide a compression coupling which is self-aligning and devoid of cocking tendencies, which will effect a particularly secure and fluid-tight connection without the necessity of handling of small sleeve and nut or bushing elements and without the need of screwing-up the nut or bushing elements of the couplings into the tapped sockets or onto the tapped nipples with resultant liability of twisting the tubing.

Another object is to provide a tubing coupling arrangement in which the coupling may be conveniently formed by the direct application of pressure or a hammer blow, without threading operations, with assurance that the coupling will stay firmly in position during usage and with further assurance that the coupling may be readily removed at any time for repair and replacement without difficulty.

Another object is to provide a compression coupling device which is particularly adapted to mass production, which may be used upon automobile assembly lines and which will necessitate much less time and labor expenditure to assure liquid and fluid-tight connections between tubing lines to be assembled on machine and automobile structures.

A special feature of the invention resides in the provision of a deformable tapered coupling sleeve which is provided with an enlarged head adapted to receive a pressure applying device or a hammer means.

In contrast to the usual construction, the tapered coupling element or its cooperating socket and/or nipple on the mounting structure, is provided with means to hold the tapered element in axial alignment and prevent rotational movement thereof during coupling and/or during subsequent use.

In forming the coupling, the deformable sleeve is pressed directly into the socket without rotation. It is provided with a relatively thin tapered end portion, which when the sleeve is pushed home will be deformed inwardly to grip the tubing and assure a satisfactory liquid-tight coupling.

Longitudinal serrations may be provided on the mounting structure or on the coupling sleeve, to assure that the sleeve will be forced into position without rotation. At the same time this serrated surface will also function to prevent ready disengagement of the coupling by turning stresses, which might tend to loosen the connection.

In the accompanying drawings in which are shown one or more of various possible embodiments of the several features of the invention, Fig. 1 is a longitudinal sectional view showing one type of coupling, the upper half showing the coupling before it is forced home and the lower showing the coupling after it has been forced home.

Fig. 2 is a similar longitudinal sectional view of a different embodiment, and

Fig. 3 is a similar longitudinal sectional view of still another embodiment, and Figs. 4 and 5 show still another embodiment, the upper half showing the coupling before it is forced home and the lower showing the coupling after it has been forced home.

Referring to Figs. 1, 2 and 3, the tubing 10 usually is formed of copper or brass, which may constitute part of a central lubricating system, as may be utilized to lubricate the chassis bearings of an automobile. These central lubricating systems may take the form of those shown and described in United States Patent Nos. 1,632,771 and 1,632,772.

The mounting structure 11 may constitute a part of the bearing structure, a pump structure, fitting such as a T or elbow, and/or a drip plug, such as shown in the above mentioned patents. The mounting structure 11, as shown in Figs. 1 to 3, is provided with a bore 12 which is enlarged at 14 to form a shoulder 13. Upon the shoulder 13 abuts the end 15 of the pipe 10. The enlargement 14 at its outer end is provided with a rounded shoulder 16 which terminates at the further or second enlargement 17. The second enlargement 17 extends to the face 18 of the mounting structure 10 and which is provided with the longitudinally milled portion 19 which may be readily cut therein by a suitable tool. The mounting structure 11 is usually of a fairly hard metal such as cast iron or steel.

Referring to Fig. 1, the coupling sleeve 20 is of a relatively deformable metal as compared to the metal of the mounting structure 11 and is conveniently made of copper or brass. The sleeve is provided with an internal bore 21, which before compression is slightly larger than the external diameter of the tubing 10. The sleeve 20 may be provided with an enlarged head 22 to receive a hammer means or a compressing tool, to force the sleeve in position into the enlargement 17 after it has been placed about the tubing end 10 and after the pipe end 10 has been inserted until its end portion 15 abuts the shoulder 13.

As shown, the sleeve 20 is provided with a cylinder 23 inside of the head 22 and is then provided with a gradually inwardly tapering portion 24 and with another portion 25 of a substantial increased taper. The tapering portion 24 and the taper portion 25 being preferably connected by a tapering portion 26 of less taper than either and it may aproach cylindrical form, if desired.

It will be noted that the tapered portion 25 will be directly inside of the knurled or milled portion 19 when the sleeve 20 is pressed into position and that the portion 26 first contacts or is placed adjacent the knurled portion 19 of the enlargement 17 of the mounting structure 11.

The application of pressure to the head 10 either by means of a hammer blow or by suitable lever tool will force the sleeve 20 into the socket, as indicated in the lower half of Fig. 1, causing a deformation, as indicated at 27, when the thinly or sharply tapered portion 25 is deformed or crimped inwardly by the curved shoulder 16. By forming the sleeve 20, as shown, it may conveniently be inserted into and coupled with a variety of sockets or enlargements of various sizes without substantial alteration in shape, form, or dimension.

For example, in one commercial embodiment, which has been satisfactorily employed, the length of the tapered sleeve was about 0.3", while the sleeve tapered from an annular thickness of 0.025" to about a thickness of 0.005". The angle of the taper end portion 25 may vary from 5 to 15°. The external diameter of the tubing in this embodiment was about .125".

In Fig. 2 is shown another sleeve embodiment very similar in construction to that of Fig. 2 with an outwardly extending tapered nose 30 which may conveniently receive a compressing or hammer tool. The sleeve 20' is shown as about to be inserted in the same socket as shown in Fig. 1. The other corresponding functioning parts of the sleeve 20' of the embodiment of Fig. 2 are represented by the same numerals primed.

In Fig. 3 is shown still another embodiment in which corresponding elements are represented by the same numerals as in Figs. 1 and 2 provided with a superior 2. The sleeve $20^2$ is here also shown about to be inserted into the same socket as shown in Fig. 1. In Fig. 3 the bore $21^2$ of the sleeve is provided with a curved shoulder 31 which merges into the enlargement 32, receiving the tapered sleeve 33 provided with the flange or out-turned shoulder 34. To the flange or out-turned portion 34 may be applied a compressing tool or hammer means as already was applied to the head $22^2$ with the result that a second crimping will be obtained or a wedging will be obtained between the tapered sleeve 33 and the sleeve $20^2$, assuring an additional coupling action between the sleeve $20^2$ and the tubing 10.

The couplings of Figs. 1 to 3 are particularly adapted to $\frac{1}{2}$" O. D. and similar sizes of tubing.

In Figs. 4 and 5 is shown still another embodiment adapted for very small size tubing of, for example, $\frac{1}{32}$" O. D. with 0.015" wall. It will be noted in these small sizes that the end $25^3$ of the tapered sleeve $20^3$ takes the form of a very thin cylinder of metal and that the socket $17^3$ is tapered continuously inwardly without being shouldered. As shown in Fig. 5, when pressure is employed and the sleeve $20^3$ and the tubing $10^3$ are forced inwardly, they will be crimped together, as indicated at $27^3$.

It is obvious that by utilizing the couplings of the present invention, it is not necessary to screw the couplings into position or to use wrenches or other turning tools, but that a coupling may be most readily obtained by the single application of a pressure tool, whether manually or automatically actuated.

It is apparent that the couplings may be most readily made, with great ease and rapidity so that couplings of the present nature are particularly valuable on automobile assembly lines where speed is the essence of operation.

The milling 19 of the socket enlargements 17 will cut into the tapered portions 24 of the sleeves 20 and will assure that the sleeve will not be turned when inserted into position. In addition the cooperation between this knurling or milling 19 and the sleeves 20 will eliminate the possibility of rotation and loosening of the sleeve 20 due to rattling or movement of the machinery so that assurance is had that the connection will be substantially permanent.

Many disadvantages of the two-piece constructions now widely utilized have been altogether eliminated. It is not necessary to handle separately bushings or nuts and small sleeves which must be placed on the ends of the pipes. There is no danger of twisting the tubing, as often occurs with the usual tapered sleeve couplings, including a threaded bushing or a tapered nut, nor is there any liability that the sleeve will cock and thus form an imperfect connection. The couplings may be readily removed without difficulty by pliers inserted under the heads 22 and it is apparent that the same couplings may be rapidly again made on the same tubing without the necessity of discarding the entire tubing length, as was necessary with prior similar couplings.

In Figs. 6, 7 and 8 is shown a specially designed tool which may be readily utilized for completing the compression coupling of Figs. 1 to 5, and for subsequently removing them when it is desired to detach the coupling connection, Fig. 6 being a side sectional view upon the line 6—6 of Fig. 8 showing the use of the tool to make the coupling, Fig. 7 being a side view of the tool in extracting position and Fig. 8 being a top view of the tool.

The tool is provided with a downwardly tapering body 60 having an enlarged head 61 and having a clevised claw foot 62. A central channel 63 passes down through one side of the head 61 and the tapering body 60 to receive the pipe 10.

The pipe 10 may go straight into the bearings, as indicated in dotted lines in Fig. 6, or it may be bent at right angles, as shown in the solid lines of Fig. 6.

In making the coupling, the flat base 64 of the tool member may be placed on the top of the enlarged head 28 of the sleeve and a hammer blow applied to the head 61, as indicated by the arrow 65 of Fig. 6. This will complete the coupling, as is indicated in the lower half of Fig. 1 and in Fig. 5. To dismantle the coupling connection the front upwardly bent extensions 65 of the claw foot 62 are placed under the head 28, as indicated in Fig. 7, and by a blow, as indicated at 66, the body 60 is caused to move to the right, as indicated by the arrow 68, with resultant pivotal motion on the elbow 67 of the claw foot 62. The extension 65 will then lift the sleeve out of the socket and will dismantle the coupling.

Other tools, of course, might be readily employed but the tool herein illustrated and described has been found most satisfactory for the purpose.

It is obvious that the coupling connection shown in the present application may be broadly applied to other than lubricating installations which have been given by way of example.

What is claimed is:—

1. In a central fluid distributing installation of the type including small bore deformable tubing, said installation including non-threaded fluid-tight compression coupling combinations for said tubing, said combinations each comprising a mounting structure provided with a converging socket, a tubing terminal inserted thereinto, an unsplit continuous annular longitudinal frusto-conical wedging member inserted in said socket and integrally provided with a central passageway, an enlarged head and a depending tapered deformable skirt to be wedged between the tubing and said socket in a fluid-tight manner and means cooperating with said member and said socket to assure that there will be no relative rotary movements between said socket and said member upon and after formation of the coupling, the inner end of said member being deformed inwardly by said socket to grip and deform said tubing.

2. In a fluid distributing installation including copper, brass and aluminum tubing of relatively small diameter, couplings each having a socket of decreasing diameter towards its inner end formed in a part adapted to be connected with the tubing, and an unsplit continuous readily deformable sleeve on the tubing adjacent to an end of the latter extending into the socket, which sleeve in its initial form is of slightly larger internal diameter throughout the whole of its length than the tubing so as to be capable of sliding movement along the latter, and is tapered over at least a part of its length to a relatively thin edge so that upon the tapered portion of the sleeve being introduced into the socket and being wedged between the latter and the corresponding part of the tube under axial pressure exerted on the sleeve, the edge at the inner end of the sleeve is deformed inwardly and is thereby caused to grip and deform the tubing, said socket and sleeve being provided with means for preventing relative rotary movement between the sockets and sleeves of the couplings during and after the wedging operations.

3. In a fluid distributing installation including copper, brass and aluminum tubing of relatively small diameter, couplings each having a socket of decreasing diameter towards its inner end formed in a part adapted to be connected with the tubing, and an unsplit continuous readily deformable sleeve on the tubing adjacent to an end of the latter extending into the socket, which sleeve in its initial form is of slightly larger internal diameter throughout the whole of its length than the tubing so as to be capable of sliding movement along the latter, and is tapered over at least a part of its length to a relatively thin edge so that upon the tapered portion of the sleeve being introduced into the socket and being wedged between the latter and the corresponding part of the tube under axial pressure exerted on the sleeve, the edge at the inner end of the sleeve is deformed inwardly and is thereby caused to grip and deform the tubing, a portion of each socket being milled longitudinally.

4. In a fluid distributing installation including copper, brass and aluminum tubing of relatively small diameter, couplings each having a socket of decreasing diameter towards its inner end formed in a part adapted to be connected with the tubing, and an unsplit continuous readily deformable sleeve on the tubing adjacent to an end of the latter extending into the socket, which sleeve in its initial form is of slightly larger internal diameter throughout the whole of its length than the tubing so as to be capable of sliding movement along the latter, and is tapered over at least a part of its length to a relatively thin edge so that upon the tapered portion of the sleeve being introduced into the socket and being wedged between the latter and the corresponding part of the tube under axial pressure exerted on the sleeve, the edge at the inner end of the sleeve is deformed inwardly and is thereby caused to grip and deform the tubing, said sleeve being provided with massive head at one end, a thin cylindrical portion at the other end, and a frusto-conical portion intermediate the ends for co-acting with the corresponding socket to form a lubricant tight connection.

5. In a fluid distributing installation including copper, brass and aluminum tubing of relatively small diameter, couplings each having a socket of decreasing diameter towards its inner end formed in a part adapted to be connected with the tubing, and an unsplit continuous readily deformable sleeve on the tubing adjacent to an end of the latter extending into the socket, which sleeve in its initial form is of slightly larger internal diameter throughout the whole of its length than the tubing so as to be capable of sliding movement along the latter, and is tapered over at least a part of its length to a relatively thin edge so that upon the tapered portion of the sleeve being introduced into the socket and being wedged between the latter and the corresponding part of the tube under axial pressure exerted on the sleeve, the edge at the inner end of the sleeve is deformed inwardly and is thereby caused to grip and deform the tubing, said sleeve being provided with an enlarged head for enabling it to be forced into the corresponding socket under the action of a hammer tool and to be withdrawn from the socket under the action of a prying tool, a shoulder in the socket forming an abutment for the end of the tubing extending into the socket, and a very thin deformable portion terminating the tapered portion of the sleeve at the end initially introduced into the socket.

6. In a central fluid distributing installation of the type including small diameter deformable tubing, said installation including unthreaded compression coupling connections for said tubing, each connection comprising a relatively thin-walled tubing terminal, a mounting structure provided with an inwardly converging untapped socket receptacle, and an unsplit continuous unthreaded annular tapering deformable sleeve telescoped around said tubing terminal and wedged between socket and said tubing terminal, said sleeve being provided with an enlarged head to receive a hammer tool on its outer face, whereby it is forced and deformed into the socket between the tubing and the converging socket, and to receive a prying tool on its inside face, whereby it is removed from the socket after coupling, said socket being interiorly provided with a stop for said tubing terminal and an inwardly wedging portion outside of said stop, and said sleeve having a tapered skirt depending from said head terminating in a very thin deformable portion deformed inwardly by said wedging portion of the socket to grip and deform the tubing terminal.

7. In a central fluid distributing installation of the type including small diameter deformable tubing, said installation including unthreaded compression coupling connections for said tubing, each connection comprising a relatively thin-walled tubing terminal, a mounting structure provided with an inwardly converging untapped socket receptacle, and an unsplit deformable unthreaded annular tapering deformable sleeve telescoped around said tubing terminal and wedged between said socket and said tubing terminal, said sleeve being provided with an enlarged head to receive a hammer tool on its outer face, whereby it is forced and deformed into the socket between the tubing and the converging socket, and to receive a prying tool on its inside face, whereby it is removed from the socket after coupling, said socket being interiorly provided with a stop for said tubing terminal and an inwardly wedging portion outside of said stop, and said sleeve having a tapered skirt depending from said head terminating in a very thin deformable portion deformed inwardly by said wedging portion of the socket to grip and deform the tubing terminal.

EDWARD H. KOCHER.